United States Patent
Wu et al.

(10) Patent No.: US 12,231,201 B2
(45) Date of Patent: Feb. 18, 2025

(54) RECONFIGURATION INTELLIGENT SURFACE DEVICE AND BEAMFORMING METHOD THEREOF

(71) Applicant: Industrial Technology Research Institute, Hsinchu (TW)

(72) Inventors: Chiu-Ping Wu, Hsinchu County (TW); Shih-Hao Fang, Hsinchu County (TW); Hsin-An Hou, New Taipei (TW); Jen-Yuan Hsu, Kinmen County (TW)

(73) Assignee: Industrial Technology Research Institute, Hsinchu (TW)

( * ) Notice: Subject to any disclaimer, the term of this patent is extended or adjusted under 35 U.S.C. 154(b) by 299 days.

(21) Appl. No.: 18/087,836

(22) Filed: Dec. 23, 2022

(65) Prior Publication Data
US 2024/0204837 A1    Jun. 20, 2024

(30) Foreign Application Priority Data
Dec. 16, 2022   (TW) .................................. 111148396

(51) Int. Cl.
*H04B 7/06* (2006.01)
*H04W 56/00* (2009.01)

(52) U.S. Cl.
CPC ........ *H04B 7/0617* (2013.01); *H04W 56/001* (2013.01)

(58) Field of Classification Search
CPC .. H04B 7/0617; H04B 7/04013; H04B 7/086; H04W 56/001; H04W 16/28
USPC ......................................................... 375/267
See application file for complete search history.

(56) References Cited

U.S. PATENT DOCUMENTS

| | | | |
|---|---|---|---|
| 11,251,537 B2 | 2/2022 | Sciancalepore et al. | |
| 2022/0014935 A1 | 1/2022 | Haija et al. | |
| 2022/0052764 A1 | 2/2022 | Medra et al. | |
| 2022/0321198 A1* | 10/2022 | Devoti | ............... H04B 7/04013 |

FOREIGN PATENT DOCUMENTS

| | | |
|---|---|---|
| CN | 107360108 | 11/2017 |
| CN | 111010219 | 11/2020 |
| CN | 114143810 | 3/2022 |
| CN | 114448586 | 5/2022 |

(Continued)

OTHER PUBLICATIONS

"Office Action of Taiwan Counterpart Application", issued on Sep. 28, 2023, p. 1-p. 10.

(Continued)

*Primary Examiner* — Fitwi Y Hailegiorgis
(74) *Attorney, Agent, or Firm* — JCIPRNET

(57) ABSTRACT

A reconfiguration intelligent surface device and a beamforming method thereof, the beamforming method adapted to the reconfiguration intelligent surface device is described below. A timing synchronization signal is received. A frame boundary synchronized with a radio signal transmission/reflection device is established according to the timing synchronization signal. Beam control information is received. A reflected beam is formed by reflecting a radio signal beam transmitted or reflected by the radio signal transmission/reflection device according to the beam control information based on the frame boundary synchronized with the radio signal transmission/reflection device.

24 Claims, 13 Drawing Sheets

(56) References Cited

FOREIGN PATENT DOCUMENTS

| CN | 114584185 | 6/2022 |
| TW | 202123644 | 6/2021 |
| WO | 2022193048 | 9/2022 |

OTHER PUBLICATIONS

Boya Di et al., "Hybrid Beamforming for Reconfigurable Intelligent Surface based Multi-user Communications: Achievable Rates with Limited Discrete Phase Shifts", IEEE Journal on Selected Areas in Communications, vol. 38, Issue 8, Jun. 8, 2020, pp. 1-30.

Daisuke Kitayama et al., "Research of Transparent RIS Technology toward 5G evolution & 6G", NTT Technical Review, vol. 19, No. 11, Nov. 2021, pp. 26-34.

Alessio Fascista et al., "RIS-Aided Joint Localization and Synchronization With a Single-Antenna Mmwave Receiver", ICASSP 2021—2021 IEEE International Conference on Acoustics, Speech and Signal Processing (ICASSP), Jun. 2021, pp. 4455-4459.

Ahmed Elzanaty et al., "Reconfigurable Intelligent Surfaces for Localization: Position and Orientation Error Bounds", IEEE Transactions on Signal Processing, vol. 69, Aug. 6, 2021, pp. 1-17.

Yu-Tse Wu et al., "Low-complexity Joint Beamforming for RIS-Aided Multi-User Downlink over Correlated Channels", arXiv:2202.11354, Feb. 23, 2022, pp. 1-35.

R.S. Prasobh Sankar et al., "Beamforming in Hybrid RIS assisted Integrated Sensing and Communication Systems", 2022 30th European Signal Processing Conference (EUSIPCO), Mar. 11, 2022, pp. 1-5.

\* cited by examiner

RECONFIGURATION INTELLIGENT SURFACE DEVICE AND BEAMFORMING METHOD THEREOF

CROSS-REFERENCE TO RELATED APPLICATION

This application claims the priority benefit of the Taiwan application serial no. 111148396, filed on Dec. 16, 2022. The entirety of the above-mentioned patent application is hereby incorporated by reference herein and made a part of this specification.

TECHNICAL FIELD

The technical field relates to a reconfiguration intelligent surface device and a beamforming method thereof.

BACKGROUND

With the evolution of mobile communication technology, it has become a trend to use high-frequency signal for communication. The adoption of high-frequency signal not only increases the available frequency band, but also improves transmission efficiency. However, due to the short wavelength and small amplitude of the high-frequency signal, the signal coverage of the high-frequency signal is limited, and the penetration ability is relatively poor and it is easily blocked by obstacles. Specifically, when there is an obstacle between the base station and the terminal device, it may not be easy for the terminal device to receive the high-frequency signal transmitted by the base station smoothly, which makes overcoming signal blockage and improving signal coverage become the focus of next-generation communication technology.

In such a communication scenario, the reconfiguration intelligent surface (RIS) technology that may change the signal transmission path has attracted extensive attention and research. The reconfiguration intelligent surface effectively improves the signal coverage of the base station and improve the transmission performance of the terminal equipment. Specifically, the reconfiguration intelligent surface reflects the received signal to the terminal equipment, so that the terminal equipment can receive the signal transmitted by the base station, thereby handling the problem of lack of signal caused by obstacle occlusion. In particular, the reconfiguration intelligent surface made of electromagnetic materials directs the reflection signal to a specific direction, thereby realizing the reconfiguration of the wireless transmission environment. In other words, after the electromagnetic wave is reflected by the reconfiguration intelligent surface, the scattering characteristics and reflected beam distribution are controllable. However, there are still many problems to be handled for the practical application of reconfiguration intelligent surfaces.

SUMMARY

The disclosure relates to a reconfiguration intelligent surface device and a beamforming method thereof, which synchronizes the reconfiguration intelligent surface device and the base station, and dynamically form a reflected beam according to the beam control information.

The embodiments of the disclosure relate to a beamforming method adapted to the reconfiguration intelligent surface device, and the method is described below. A timing synchronization signal is received. A frame boundary synchronized with a radio signal transmission/reflection device is established according to the timing synchronization signal. Beam control information is received. A reflected beam is formed by reflecting a radio signal beam transmitted or reflected by the radio signal transmission/reflection device according to the beam control information based on the frame boundary synchronized with the radio signal transmission/reflection device.

The embodiments of the disclosure relate to a reconfiguration intelligent surface device, which includes a reconfiguration intelligent surface, a transceiver, a memory, and a processor. The processor is coupled to the reconfiguration intelligent surface, the transceiver, and the memory, and configured to execute the following process. A timing synchronization signal is received through the transceiver. A frame boundary synchronized with the radio signal transmission/reflection device is established according to the timing synchronization signal. Beam control information is received through the transceiver. A reflected beam is formed by reflecting a radio signal beam transmitted or reflected by a radio signal transmission/reflection device according to the beam control information based on the frame boundary synchronized with the radio signal transmission/reflection device.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSURED EMBODIMENTS

In order to make the aforementioned features of the disclosure comprehensible, embodiments accompanied with drawings are described in detail below. It is to be understood that both the foregoing general description and the following detailed description are exemplary, and are intended to provide further explanation of the disclosure as claimed.

Figure 1:
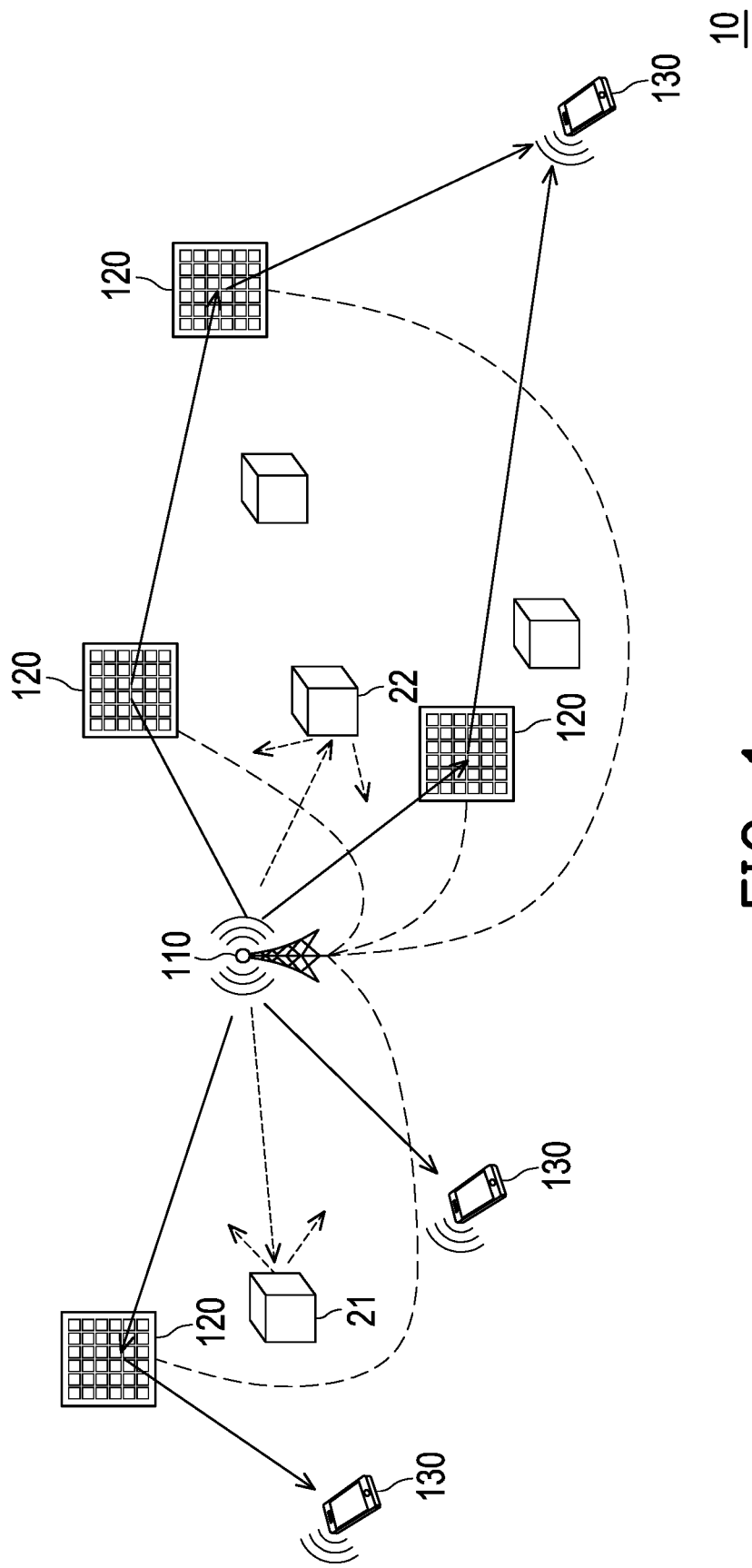
FIG. 1 is a schematic diagram of a communication system of an exemplary embodiment according to the disclosure.

FIG. 1 is a schematic diagram of a communication system according to an embodiment of the disclosure. Referring to FIG. 1, a communication system 10 includes, but not limited to, a base station (BS) 110, a reconfiguration intelligent surface (RIS) device 120, and a terminal device 130. It should be noted that although FIG. 1 shows one base station 110, four RIS devices 120, and three terminal devices 130, the number of base stations, the number of RIS devices, and the number of terminal devices are not limited in this disclosure.

In the embodiment of the disclosure, the base station 110 is a physical device capable of communicating with the terminal device 130 through a radio signal. The base station 110 may be, for example, network equipment in the future evolution such as a home evolved node B (HeNB), an evolved node B (eNB), a next generation node B (gNB), a base transceiver system (BTS), a repeater, an access point, a transponder, a public land mobile network (PLMN), etc. The base station 110 may provide wireless communication coverage for a specific area (e.g., a fixed or changing geographic area).

In the embodiment of the disclosure, the terminal device 130 may be an user equipment (UE), which is, for example, a mobile station, an advanced mobile station (AMS), a server, a user terminal, a mobile phone, a desktop computer, a notebook computer, a network computer, a work-station, a personal digital assistant (PDA), a tablet personal computer (PC), a scanner, a telephone device, a pager, a camera, a television, a handheld video game device, a music device, a wireless sensors, an IoT device, etc. In some applications, a terminal device 130 may be a stationary computer device operating in a mobile environment such as a bus, a train, an airplane, a boat, an automobile, etc.

In the embodiment of the disclosure, the base station 110 may communicate with each other or with the terminal device 130 using new radio (NR), long-term evolution (LTE), LTE-advanced (LTE-A), worldwide interoperability for microwave access (WiMAX), wireless LAN (WLAN), code division multiple access (CDMA), wireless local area network (WLAN), or other wireless communication technology.

In the embodiment of the disclosure, the base station 110 may use beamforming technology to generate multiple beams. Beamforming technology is a technology that transmits signals through multiple antennas so that signals are aggregated to a specific direction. The base station 110 may adjust the phase of the signal transmitted from each of the antennas, so that the signals transmitted by all antennas are concentrated in a specific direction through destructive and constructive processes, thereby generating a directional beam. In FIG. 1, an obstacle (e.g., obstacle 21 or obstacle 22) may obscure the signal transmitted by the base station 110 and cause a blockage effect, making it impossible/difficult for the terminal device 130 to directly receive the signal transmitted by the base station 110.

In the embodiment of the disclosure, the RIS device 120 directionally reflects the signal transmitted by the base station 110 to the terminal device 130, thus effectively improving the signal coverage of the base station 110. That is, the RIS device 120 enables the signal transmitted by the base station 110 to reach areas that are inaccessible/difficult to reach. In some embodiments, the RIS device 120 is used as a passive device, and the reflection direction of the RIS device 120 is controlled by the base station 110 or other control nodes. For example, the RIS device 120 reflects the base station signal to the terminal device 130 in the reflection direction indicated by base station 110. In addition, the RIS device 120 may receive the radio signal transmitted by the terminal device 130 in the direction indicated by the base station 110, and reflect the radio signal transmitted by the terminal device 130 to the base station. In an embodiment, the RIS device 120 may receive the radio signal reflected by another RIS device 120 in the direction indicated by the base station 110, and reflect the radio signal reflected by the other RIS device 120 to the base station 110, the terminal device 130, or yet another RIS device 120. In other words, the RIS device 120 may reflect radio signals from the base station 110, the terminal device 130, or other RIS devices 120. Moreover, the RIS device 120 may direct the reflected signal to the base station 110, the terminal device 130, or other RIS devices 120.

In the embodiment of the disclosure, the RIS device 120 is communicably connected to the base station 110 or another base station not shown in FIG. 1 via a wired communication link or a wireless communication link, so that the base station 110 or the other base station may transmit a timing synchronization signal and beam control information to the RIS device 120. In some embodiments, the RIS device 120 receives the timing synchronization signal and the beam control information from the same base station (e.g., the base station 110 in FIG. 1). Alternatively, in some embodiments, the RIS device 120 receives the timing synchronization signal and the beam control information respectively from different base stations (e.g., the base station 110 in FIG. 1 and the other base station not shown in FIG. 1). For example, the RIS device 120 may receive the timing synchronization signal from the base station 110 and receive the beam control information from the other base station. Alternatively, the RIS device is communicably connected to other control devices (not shown in FIG. 1) via a wired communication link or a wireless communication link to receive the timing synchronization signal from the base station 110 and the beam control information from the other control devices. The above-mentioned control device is, for example, a base station coordinator, etc. In some embodiments, the base station 110 communicates with the RIS device 120 through an air interface. For example, the base station 110 may communicate with the RIS device 120 based on a bluetooth protocol, a Wi-Fi protocol, a universal asynchronous receiver/transmitter (UART) protocol, a Zigbee protocol, a cellular network communication protocol (also known as the mobile communication network protocol). In an embodiment, in response to the base station 110 and the RIS device 120 communicating according to the cellular network communication protocol, the base station 110 may use the LTE-M (Long Term Evolution Category M) standard formulated by the 3GPP organization to communicate with the RIS device 120. Alternatively, in some embodiments, the base station 110 communicates with the RIS device 120 through a physical cable interface. For example, the base station 110 communicates with the RIS device 120 through an enhanced common public radio interface (eCPRI), the Ethernet, or other wired networks.

Figure 2:
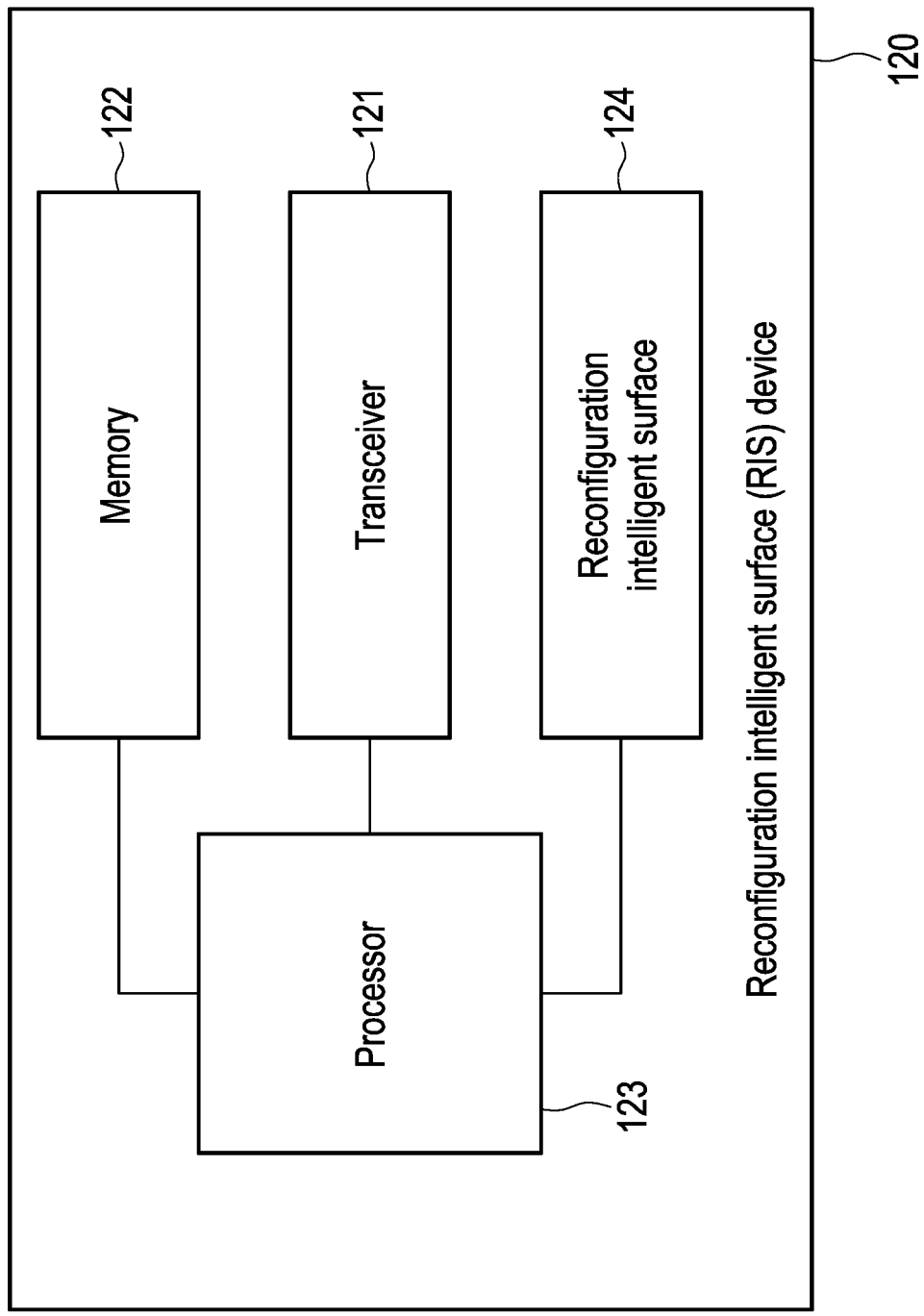
FIG. 2 is a block diagram of a reconfiguration intelligent surface device according to an exemplary embodiment of the disclosure.

Referring to FIG. 2, which is a block diagram of a reconfiguration intelligent surface device according to an exemplary embodiment of the disclosure. The RIS device 120 may include a transceiver 121, a memory 122, a processor 123, and a reconfiguration intelligent surface 124.

The transceiver 121 is coupled to the processor 123. The transceiver 121 may perform operations such as low noise amplification (LNA), impedance matching, frequency mixing, up-down frequency conversion, filtering, amplification, and/or the like. It is known from the foregoing description that the transceiver 121 communicates with the base station 110 through a wired transmission link or a wireless transmission link. That is, the transceiver 121 for communicating with the base station supports wired transmission protocol or wireless transmission protocol.

The memory 122 is coupled to the processor 123 and is, for example, any type of fixed or mobile volatile memory or non-volatile memory, such as random access memory (RAM), read-only memory (ROM), flash memory, hard disk (HDD), solid state drive (SSD), other similar elements, or a combination thereof. The memory 122 stores multiples commands, modules, or programs accessed by the processor 123, so that the processor 123 may execute one or more operations of the communication method described in the disclosure.

The processor 123 is, for example, a central processing unit (CPU), other programmable general-purpose or special-purpose microprocessor, digital signal processor (DSP), programmable controller, application specific integrated circuit (ASIC), graphics processing unit (GPU), complex programmable logic device (CPLD), field programmable gate array (FPGA), and other similar elements, or a combination thereof. The processor 123 accesses and executes the commands, modules, or programs in the memory 122 to execute one or more operations of the beamforming method described in the disclosure.

The RIS 124 may include multiple uniformly distributed RIS elements (also called electronically controlled elements). The RIS elements of the RIS device 120 have an electromagnetic characteristic of reconfigurability. The disclosure does not limit the arrangement of the RIS elements. The arrangement of the RIS elements may be a matrix arrangement, a ring arrangement, or other shape of arrangement. The RIS 124 may change the reflection direction, the beam width, etc., in a controlled manner based on the combination of the states of the configuration of the element. In some embodiments, the RIS element of the RIS 124 is controlled by the processor 123 according to the beam control information provided by the base station 110.

Figure 3:
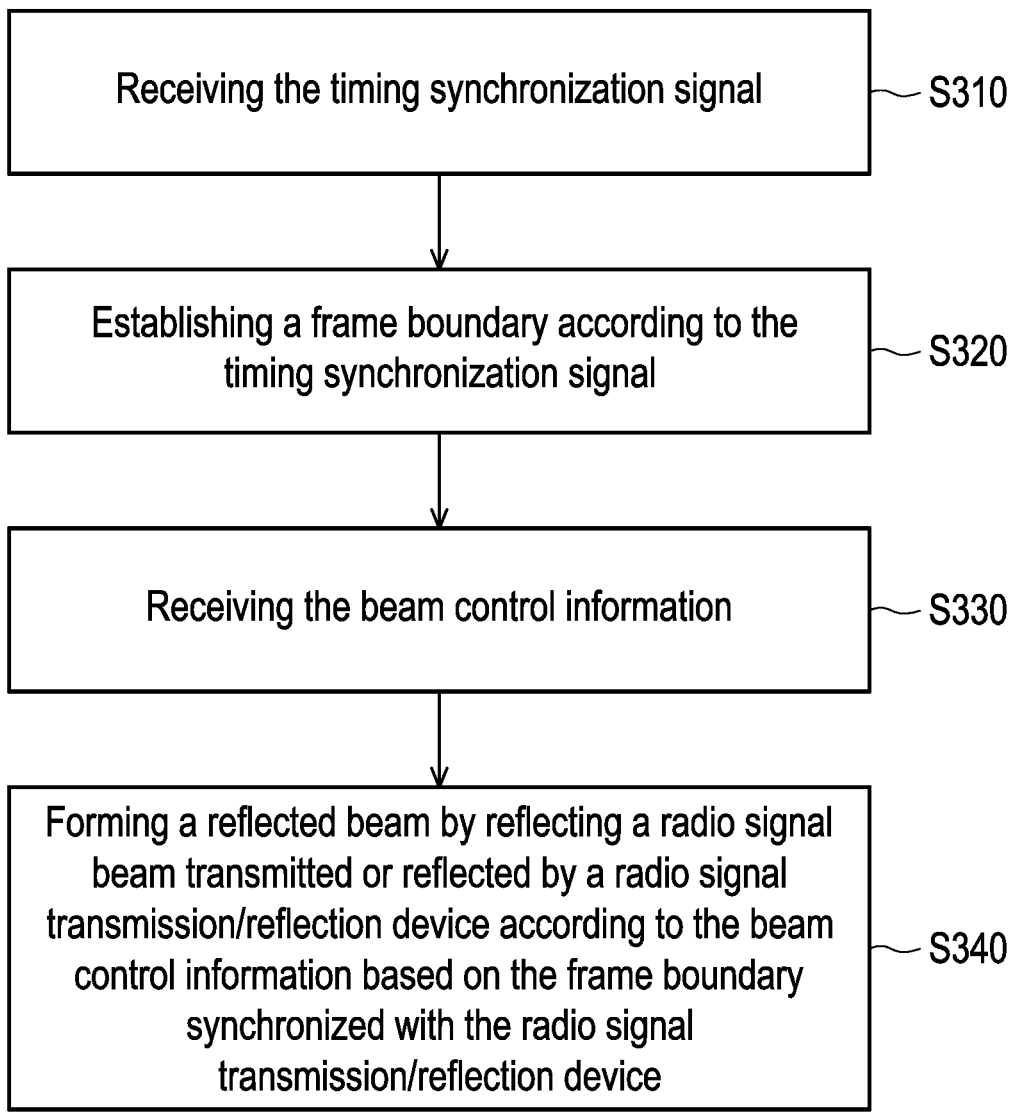
FIG. 3 is a flowchart of a beamforming method according to an exemplary embodiment of the disclosure.

FIG. 3 is a flowchart of a beamforming method according to an exemplary embodiment of the disclosure. Referring to FIG. 1 and FIG. 3, in step S310, the RIS device 120 receives the timing synchronization signal. In some embodiments, the RIS device 120 receives the timing synchronization signal from the base station 110 via a wired transmission link or a wireless transmission link. In some embodiments, in response to receiving the timing synchronization signal from the other base station, the base station 110 transmits a timing synchronization signal to the RIS device 120, so that the RIS device 120 may receive the timing synchronization signal from the base station via a wired transmission link or a wireless transmission link. In some embodiments, the timing synchronization signal may be a timing synchronization message of a precision time protocol (PTP), a general PTP, or a timing and synchronization protocol (e.g., IEEE 802.1AS). Alternatively, in some embodiments, the timing synchronization signal is also a synchronization signal, a reference signal, a system information signal, etc., in a wireless transmission environment.

In step S320, the RIS device 120 establishes a frame boundary synchronized with the radio signal transmission/reflection device according to the timing synchronization signal. Specifically, the RIS device 120 aligns the frame boundary of the RIS device 120 with the frame boundary of the radio signal transmission/reflection device according to the timing synchronization signal. In this way, after the frame boundary of the radio signal transmission/reflection device is synchronized with the frame boundary of the RIS device, the RIS device 120 reflects the radio signal beam transmitted or reflected by the radio signal transmission/reflection device within a period specified based on the frame boundary synchronized with the radio signal transmission/reflection device. The aforementioned radio signal transmission/reflection device may include the base station 110, the other base station, the terminal device 130, other RIS device 120, or other radio devices.

In some embodiments, the RIS device 120 establishes the timing for reflecting the radio signal beam according to the timing synchronization signal transmitted by the base station 110. The radio signal may be a radio signal beam generated or reflected by the base station 110, the other base station, the terminal device 130, other RIS device 120, and other radio devices. Alternatively, in some embodiments, in the case that the radio signal transmission/reflection device is the base station 110, the RIS device 120 establish a frame boundary synchronized with the base station 110 according to the timing synchronization signal transmitted by the base station 110 or the other base station (not shown in FIG. 1). In other words, the RIS device 120 establish a frame boundary synchronized with the other base station according to the timing synchronization signal transmitted by the base station 110 to reflect a base station beam emitted by the other base station. Alternatively, the RIS device 120 establish the frame boundary synchronized with the base station 110 according to the timing synchronization signal transmitted by the other base station to reflect a base station beam emitted by the base station 110. Alternatively, the RIS device 120 establish a frame boundary synchronized with the other RIS devices 120 or the terminal device 130 according to the timing synchronization signal transmitted by the base station 110 to reflect the radio signal beam reflected or emitted by the other RIS devices 120 or the terminal device 120.

In some embodiments, the RIS device 120 obtains a clock shift between a reference clock of the radio signal transmission/reflection device (e.g., the base station 110 or the other base station) and a local clock of the RIS device 120 according to the timing synchronization signal. Afterwards, the RIS device 120 establishes the frame boundary synchronized with the radio signal transmission/reflection device (e.g., the base station 110 or the other base station) according to the clock shift. Alternatively, in some embodiments, the timing synchronization signal transmitted by the base station 110 or the other base station carries time information of the frame boundary of the base station 110, so that the RIS device 120 may establish the frame boundary synchronized with the base station 110 according to the timing synchronization signal.

Figure 4:
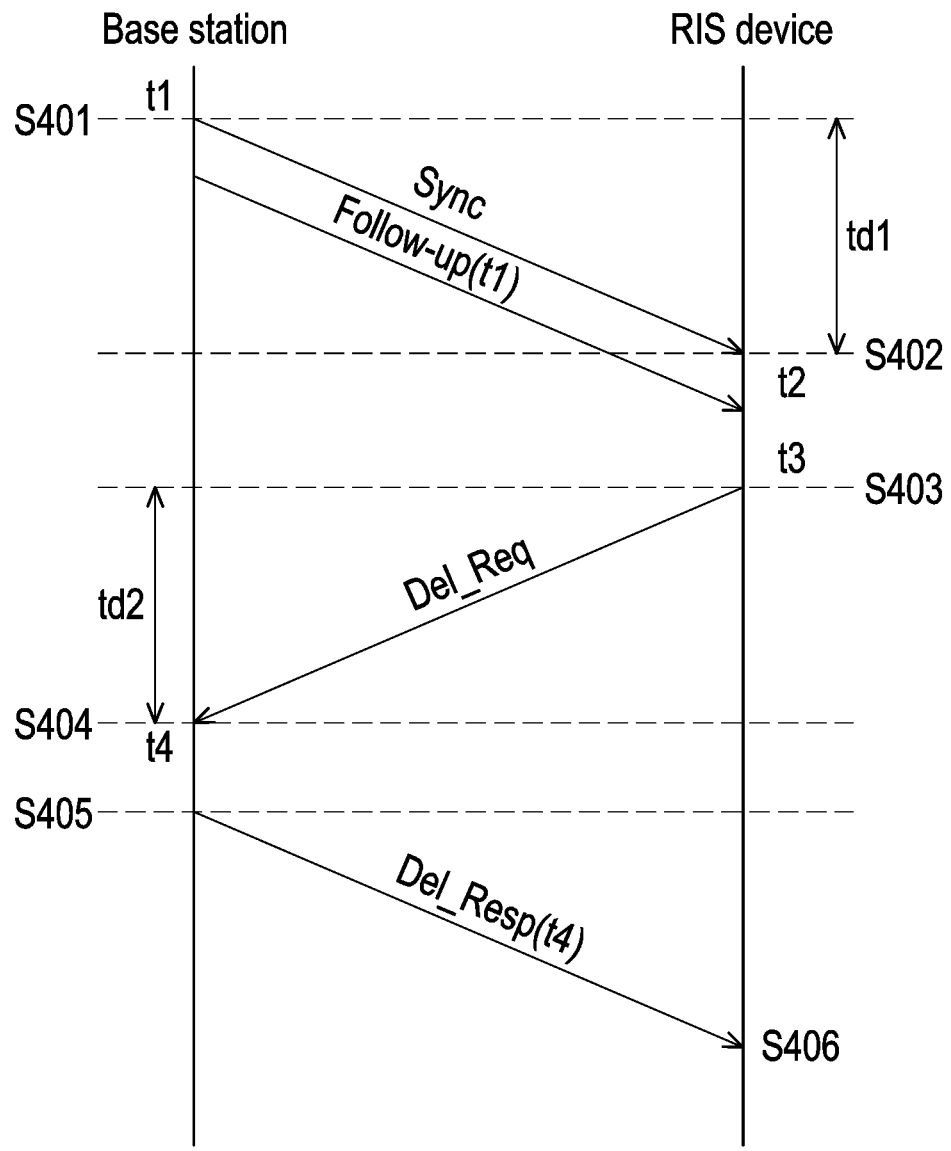
FIG. 4 is a flowchart of a precision time protocol (PTP) synchronization message exchange according to an exemplary embodiment of the disclosure.

FIG. 4 is a flowchart of a precision time protocol (PTP) synchronization message exchange according to an exemplary embodiment of the disclosure. Referring to FIG. 4, the PTP message exchange procedure includes the base station 110 as a master end and the RIS device 120 as a slave end communicating with each other.

In step S401, at time point t1, the base station 110 transmits a synchronize message Sync to the RIS device 120. The time point t1 is the timestamp of the synchronized message Sync leaving the base station 110. Optionally, step S401 may adopt a one-step manner. At this time, the synchronize message Sync includes the timestamp t1. Optionally, step S401 may adopt a two-step (two-step) manner. At this time, after the base station 110 transmits the synchronize message Sync, the base station 110 further transmits a follow-up message Follow-up (t1) to the RIS device 120. The follow-up message Follow-up (t1) includes the timestamp t1.

In step S402, at time point t2, the RIS device 120 receives the synchronize message Sync. A time difference td1 is a difference between the timestamp t2 and the timestamp t1. In step S403, at time point t3, the RIS device 120 transmits a delay request message Del_Req to the base station 110. The delay request message Del_Req includes the timestamp t3. The timestamp t3 is the timestamp of the delay request message Del_Req leaving the RIS device 120.

In step S404, at time point t4, the base station 110 receives the delay request message Del_Req. A time difference td2 is a difference between the timestamp t4 and the timestamp t3. In step S405, the base station 110 replies with a delay request response message Del_Resp (t4). The delay request response message Del_Resp(t4) includes the timestamp t4. In step S406, the RIS device 120 calculates a link delay MeanPathDelay according to the timestamps t1, t2, t3, t4. Specifically, the RIS device 120 calculates the link delay MeanPathDelay according to the following formula (1), and calculates a clock shift OFFS according to formula (2).

$$\text{MeanPathDelay} = ((t2 - t1) + (t4 - t3))/2 \quad \text{Formula (1)}$$

$$\text{OFFS} = t2 - t1 - \text{MeanPathDelay} \quad \text{Formula (2)}$$

Afterwards, the RIS device 120 may establish a frame boundary synchronized with the base station 110 according to the clock shift OFFS, so that the frame boundary of the RIS device 120 is synchronized with the frame boundary of the base station 110. In addition, in some other embodiments, in response to the PTP message being transmitted through the wireless transmission link, the calculation of the clock shift is calculated while considering the wireless transmission delay.

Back to FIG. 3, in step S330, the RIS device 120 receives the beam control information. The RIS device 120 receives the beam control information via a wired transmission link or a wireless transmission link. In some embodiments, the transceiver 121 of the RIS device 120 receives the beam control information from the base station 110, the other base station, or other control devices. That is, the transmitter of the timing synchronization signal and the transmitter of the beam control information may be the same base station 110. Alternatively, the transmitter of the timing synchronization signal and the transmitter of the beam control information may be the base station 110 and other base station, respectively.

In step S340, the RIS device 120 forms a reflected beam by reflecting a radio signal beam transmitted or reflected by a radio signal transmission/reflection device according to the beam control information based on the frame boundary synchronized with the radio signal transmission/reflection device. In some embodiments, after the radio signal transmission/reflection device and the RIS device 120 are synchronized, the RIS device 120 reflects a base station beam as a reflected beam towards the terminal device 130 at a time point specified by the base station 110. In addition, in some embodiments, the RIS device 120 directs the receiving direction towards the terminal device 130 at a time point indicated by the base station 110, so as to reflect the radio signal transmitted by the terminal device 130 to the base station 110. For example, in response to the base station 110 generating a certain base station beam towards the RIS device 120 at a certain time slot, the RIS device 120 may synchronously reflect the base station beam to the terminal device 130 according to the frame boundary synchronized with the base station. Alternatively, the RIS device 120 may also synchronously direct the receiving beam to the base station 110 according to the frame boundary synchronized with the base station.

In some embodiments, the beam control information may include beam scheduling information. The RIS device 120 reflects the radio signal beam at a time slot specified by the base station 110 according to the beam scheduling information and switches the reflected beam according to the beam scheduling information. Additionally, in some embodiments, the beam control information may include multiple beam characteristics configurations associated with multiple reflected beams. The beam characteristics configuration is configured to control the beam characteristics of the reflected beam generated by the RIS device 120.

In some embodiments, the beam scheduling information includes time slot information and beam identification information corresponding to the time slot information. The RIS device 120 reflects a radio signal beam at a time slot indicated by the time slot information based on the frame boundary synchronized with the radio signal transmission/reflection device and forms the reflected beam according to the beam identification information.

In some embodiments, the RIS device 120 forms the reflected beam according to one of the beam characteristics configurations corresponding to the beam identification information. Each of the beam characteristics configuration includes a beam reflection direction parameter and a beam shape parameter.

Figure 5:
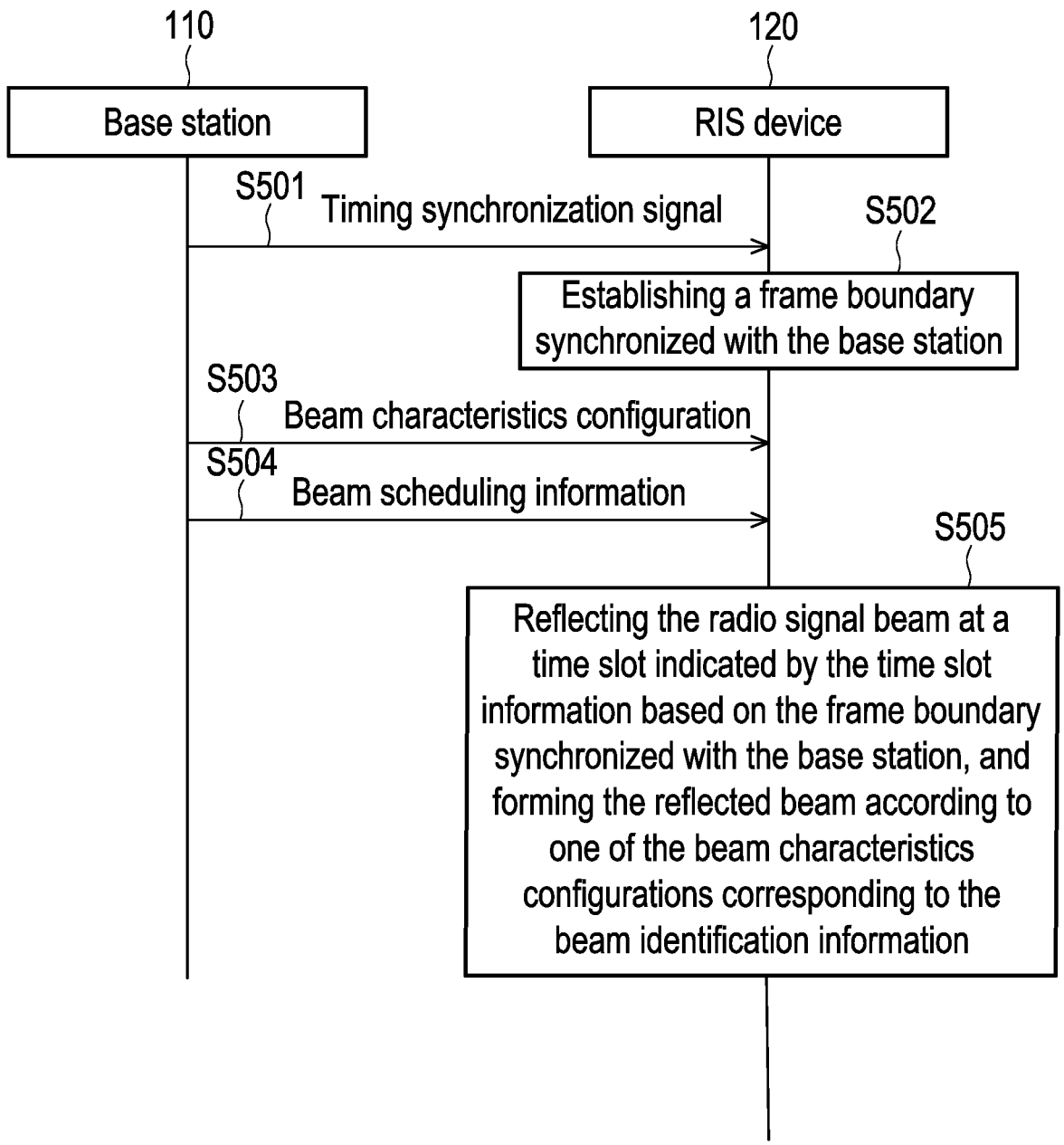
FIG. 5 is a flowchart of a beamforming method according to an exemplary embodiment of the disclosure.

Establishing a frame boundary synchronized with the base station 110 by the RIS device 120 is used as examples for illustration. FIG. 5 is a flowchart of a beamforming method according to an exemplary embodiment of the disclosure. Referring to FIG. 5, in step S501, the base station 110 transmits the timing synchronization signal to the RIS device 120, and the RIS device 120 receives the timing synchronization signal. In step S502, the RIS device 120 establishes a frame boundary synchronized with the base station 110 according to the timing synchronization signal. The detailed implementation content of step S501 and step S502 has been described above, and is not repeated herein.

In step S503, the base station 110 transmits multiple beam characteristics configurations to the RIS device 120, and the RIS device 120 receives the beam characteristics configurations. The beam characteristics configurations respectively correspond to different reflected beams, and each of the beam characteristics configuration includes the beam reflection direction parameter and the beam shape parameter. In addition, the beam characteristics configurations may correspond to different beam indexes respectively.

Specifically, in some embodiments, the base station 110 configures the beam characteristics of at least one reflected beam of the RIS device 120. For example, the base station 110 configures the beam characteristics of at least one reflected beam of the RIS device 120 according to the channel state information (CSI) reported by the terminal device 130. The beam reflection direction and/or the beam shape of the reflected beam generated by the RIS device 120 is controlled by the base station 110. The beam characteristics of the reflected beam of RIS device 120 can be determined according to actual channel conditions and/or communication requirements. In some embodiments, the base station 110 transmits the CSI reference signal (CSI-RS) through the base station beam, and the terminal device 130 measures the CSI-RS reflected by the RIS device 120 and reports the measurement result to the base station 110. In this way, the base station 110 may preconfigure the beam characteristics of one or more reflected beams of the RIS device 120 according to the measurement results reported by the terminal device 130. After the base station 110 configures the beam characteristics of one or more reflected beams of the RIS device 120, the base station 110 generates one or more beam characteristics configurations associated with the one or more reflected beams, respectively. In one embodiment, the base station 110 transmits a plurality of base station beams with different angles to the terminal device 130. The terminal device 130 measures signal quality of the base station beams by CSI-RS and selects one of the base station beams for the base station 110 to configure the beam characteristics of one or more reflected beams of the RIS device 120. In one embodiment, the base station 110 transmits a plurality of base station beams with different angles on a plurality of times to the terminal device 130. The base station 110 select one of the base station beams according to packet receiving accuracy (for example, the number of acknowledgements (ACK) the base station beam with the largest number of ACK received from the terminal device 130) and configure the beam characteristics of one or more reflected beams of the RIS device 120.

Figure 6:
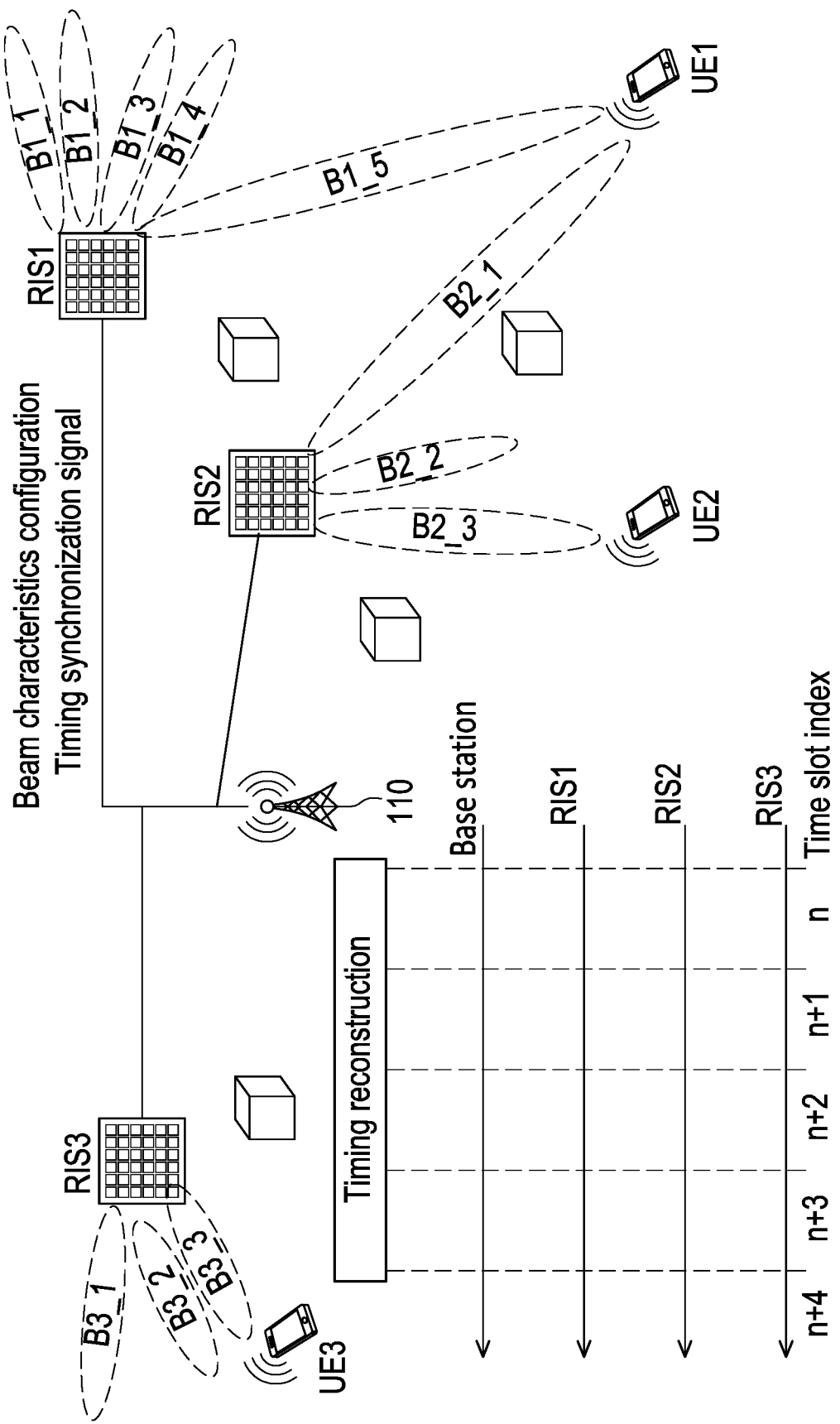
FIG. 6 is a schematic diagram of establishing a synchronization frame boundary and configuring a beam characteristics configuration according to an exemplary embodiment of the disclosure.

For example, FIG. 6 is a schematic diagram of establishing a synchronization frame boundary and configuring a beam characteristics configuration according to an exemplary embodiment of the disclosure. Referring to FIG. 6, the base station 110 transmits the timing synchronization signal to the RIS device RIS1, RIS device RIS2, and RIS device RIS3, so that the RIS device RIS1, RIS device RIS2, and RIS device RIS3 may establish a frame boundary synchronized with the base station 110, respectively. As shown in FIG. 6, by synchronizing the frame boundaries, time slot boundaries of the time slots used by the base station 110 are aligned with time slot boundaries of the time slots used by the RIS device RIS1, RIS device RIS2, and RIS device RIS3, respectively.

In addition, as shown in FIG. 6, the base station 110 transmits the beam characteristics configurations configured for the RIS device RIS1 to the RIS device RIS1. Similarly, the base station 110 transmits the beam characteristics configurations configured for the RIS device RIS2 to the RIS device RIS2, and transmit the beam characteristics configurations configured for the RIS device RIS3 to the RIS device RIS3. Taking the RIS device RIS2 as an example, the base station 110 transmits the beam characteristics configuration respectively corresponding to three reflected beams B2_1, B2_2, and B2_3 to the RIS device RIS2, so that the RIS device RIS2 may form the reflected beams B2_1, B2_2, B2_3 according to the beam characteristics configuration. Similarly, the RIS device RIS1 may form reflected beams B1_1, B12, B1_3, B1_4, B1_5 according to the beam characteristics configurations, and the RIS device RIS3 may form reflected beams B3_1, B3_2, B3_3 according to the beam characteristics configurations. The beam characteristics configuration includes reflected beam angle, reflected beam width, scattering coefficient, etc. In addition, for the RIS device RIS2, the reflected beams B2_1, B2_2, and B2_3 may respectively correspond to different beam indexes.

Figure 7:
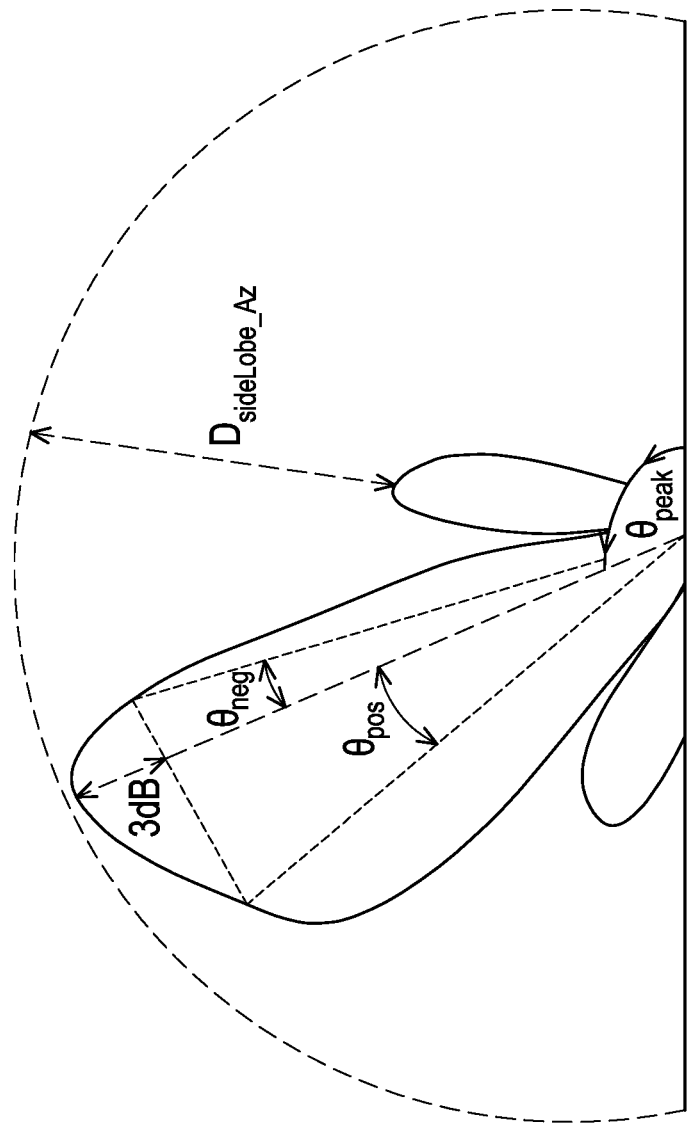
FIG. 7 is a schematic diagram of a reflected beam corresponding to a beam characteristics configuration according to an exemplary embodiment of the disclosure.

For example, FIG. 7 is a schematic diagram of a reflected beam corresponding to a beam characteristics configuration according to an exemplary embodiment of the disclosure. Referring to FIG. 7, the corresponding beam characteristics configuration of the reflected beam include the beam reflection direction parameter $\theta_{peak}$ and the beam shape parameters $\theta_{neg}$, $\theta_{pos}$, and $D_{sideLobe\_Az}$. The beam reflection direction parameter $\theta_{peak}$ indicates the azimuth angle of the beam peak. The beam shape parameter $\theta_{neg}$ indicates the half beam width in response to the azimuth angle decreases and the beam peak falls by 3 dB. The beam shape parameter $\theta_{pos}$ indicates the half beam width in response to the azimuth angle increases and the beam peak falls by 3 dB. $D_{sideLobe\_Az}$ indicates the gap or the ratio between the beam peak and the side lobe of the azimuth angle. In addition, although not shown in FIG. 7, the beam characteristics configuration of the reflected beam may further include the beam reflection direction parameter $\Phi_{peak}$ and the beam shape parameters $\Phi_{neg}$, $\Phi_{pos}$, and $D_{sideLobe\_Zen}$. The beam reflection direction parameter $\Phi_{peak}$ indicates the zenith angle of the beam peak. The beam shape parameter $\Phi_{neg}$ indicates the half beam width in response to the zenith angle decreases and the beam peak falls by 3 dB. The beam shape parameter $\Phi_{pos}$ indicates the half beam width in response to the zenith angle increases and the beam peak falls by 3 dB. $D_{sideLobe\_Zen}$ indicates the gap or the ratio between the beam peak and the side lobe of the zenith angle.

In some embodiments, the RIS device 120 (e.g., the RIS devices RIS1, RIS2, and RIS3 shown in FIG. 6) adjusts the beam characteristics configurations based on channel measurement status associated with the base station 110, the RIS device 120, and the terminal device 130. Specifically, the base station 110 adjusts the beam characteristics configurations according to the channel state information reported by the terminal device 130 at regular or irregular intervals based on the variability of the channel environment and the mobility of the terminal device 130. Correspondingly, the RIS device 120 adjusts the beam characteristics configurations according to the control of the base station 110.

In step S504, the base station 110 transmits the beam scheduling information to the RIS device 120, and the RIS device 120 receives the beam scheduling information. The beam scheduling information includes time slot information and beam identification information corresponding to the time slot information. The time slot information is, for example, time slot index, and the beam identification information is, for example, beam index. In other words, the base station 110 notifies the RIS device 120 through the beam scheduling information to generate a certain reflected beam at a specified time slot, so that the terminal device 130 may receive the base station signal. Alternatively, the base station 110 notifies the RIS device 120 through the beam scheduling information to reflect the radio signal beam transmitted by the terminal device 130 to the base station 110 at a specified time slot. In an embodiment, step S504 may also be executed first and then step S503. It should be noted that, for clarity, the embodiments of FIG. 5 and FIG. 6 uses the same base station 110 to transmit the beam control signal and the timing synchronization signal to one or more RIS devices (e.g., RIS device, 120, RIS1, RIS2, RIS3), but the disclosure is not limited thereto.

As shown in FIG. 5, in step S505, the RIS device 120 reflects the radio signal beam at a time slot indicated by the time slot information based on the frame boundary synchronized with the base station 110, and forms the reflected beam according to one of the beam characteristics configurations corresponding to the beam identification information. For example, the base station 110 in-forms the RIS device 120 through the beam scheduling information to reflect the base station beam at the $n^{th}$ time slot. The RIS device 120 determines the beam characteristics configuration according to the beam index corresponding to the $n^{th}$ time slot in the beam scheduling information, so that the RIS device 120 forms a reflected beam towards the terminal device 130 at the $n^{th}$ time slot according to the beam characteristics configuration determined.

Figure 8A:
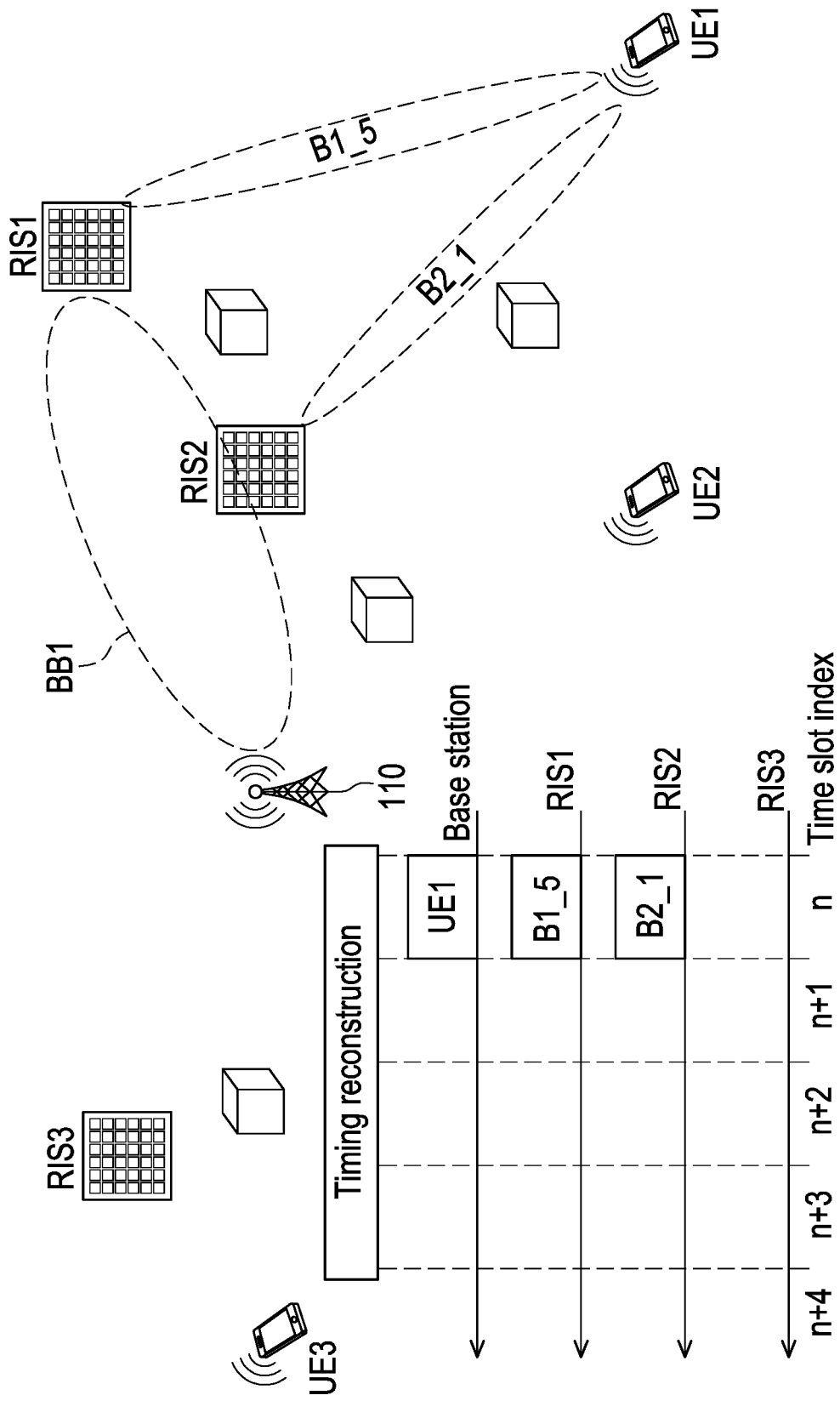
FIG. 8A to FIG. 8D are schematic diagrams of dynamically switching reflected beams according to beam scheduling information according to an exemplary embodiment of the disclosure.

FIG. 8A to FIG. 8D are schematic diagrams of dynamically switching reflected beams according to beam scheduling information according to an exemplary embodiment of the disclosure. Referring to FIG. 8A, the beam scheduling information provided to the RIS device RIS2 includes a time slot index of a time slot #n and a beam index corresponding to the time slot #n. Thus, the RIS device RIS2 reflects a base station beam BB1 (the first radio signal beam in this embodiment) transmitted by the base station 110 (the radio signal transmission/reflection device in this embodiment) at time slot #n (the first time slot in this embodiment) based on the frame boundary synchronized with the base station 110 to form a reflected beam B2_1 (the first reflected beam in this embodiment) towards a terminal device UE1 (the first wireless communication equipment in this embodiment). Similarly, the RIS device RIS1 reflects the base station beam BB1 transmitted by the base station 110 at time slot #n based on the frame boundary synchronized with the base station 110 to form a reflected beam B1_5 towards the terminal device UE1.

Figure 8B:
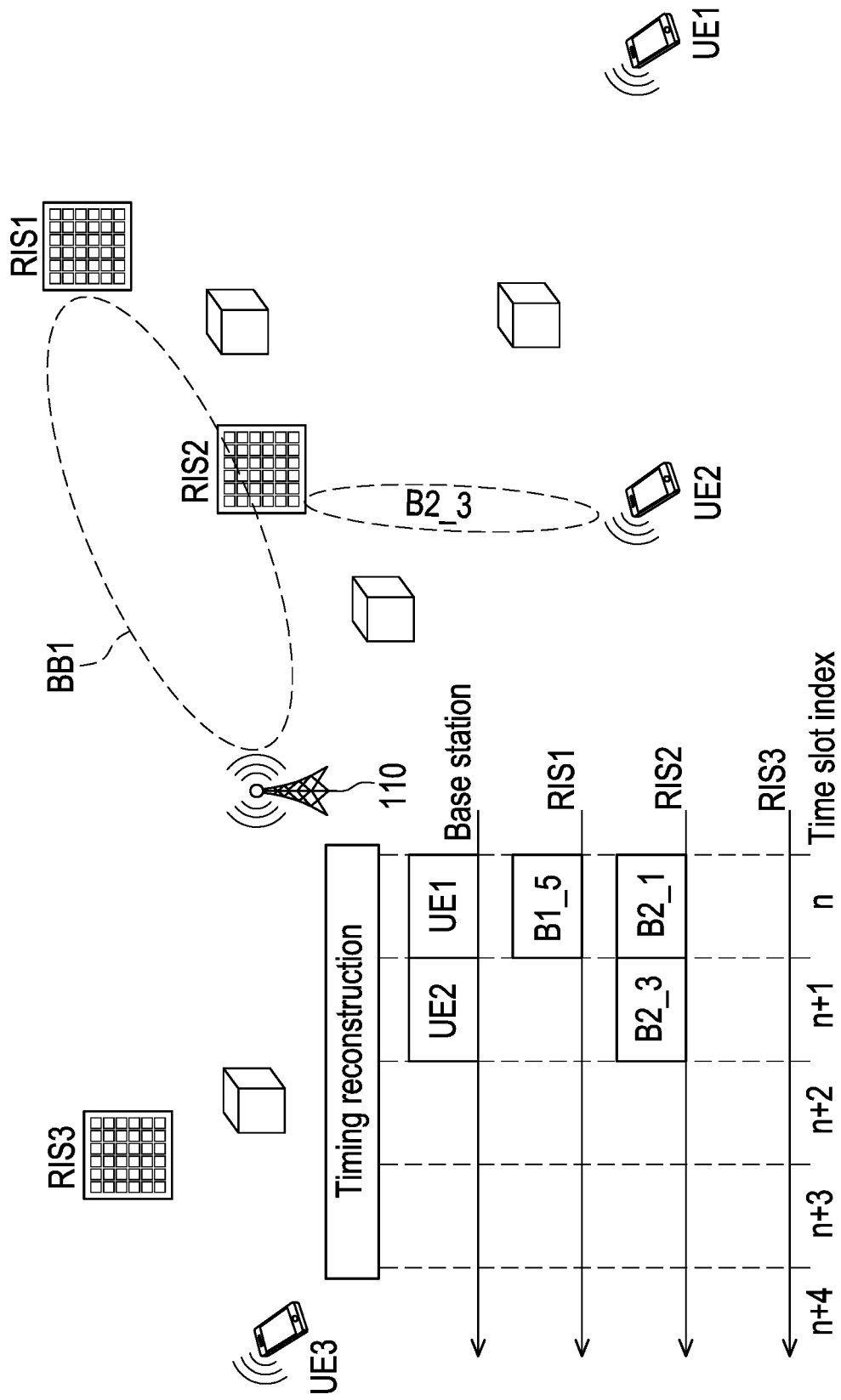

Referring to FIG. 8B, the RIS device RIS2 reflects the base station beam BB1 (the second radio signal beam in this embodiment) transmitted by the base station 110 (the radio signal transmission/reflection device in this embodiment) at time slot #n+1 (the second time slot in this embodiment) based on the frame boundary synchronized with the base station 110 to form a reflected beam B2_3 (the second reflected beam in this embodiment) towards a terminal device UE2 (the second wireless communication equipment in this embodiment). Referring to FIG. 8A and FIG. 8B at the same time, a reflection angle of the reflected beam B2_1 (the first reflected beam in this embodiment) is different from a reflection angle of the reflected beam B2_3 (the second reflected beam in this embodiment). That is, according to the instruction of the beam scheduling information, the RIS device RIS2 generates reflected beams corresponding to different reflection angles in different time slots. Thus, the RIS device RIS2 dynamically switches the reflection angle of the reflected beam according to the beam scheduling information provided by the base station 110.

Figure 8C:
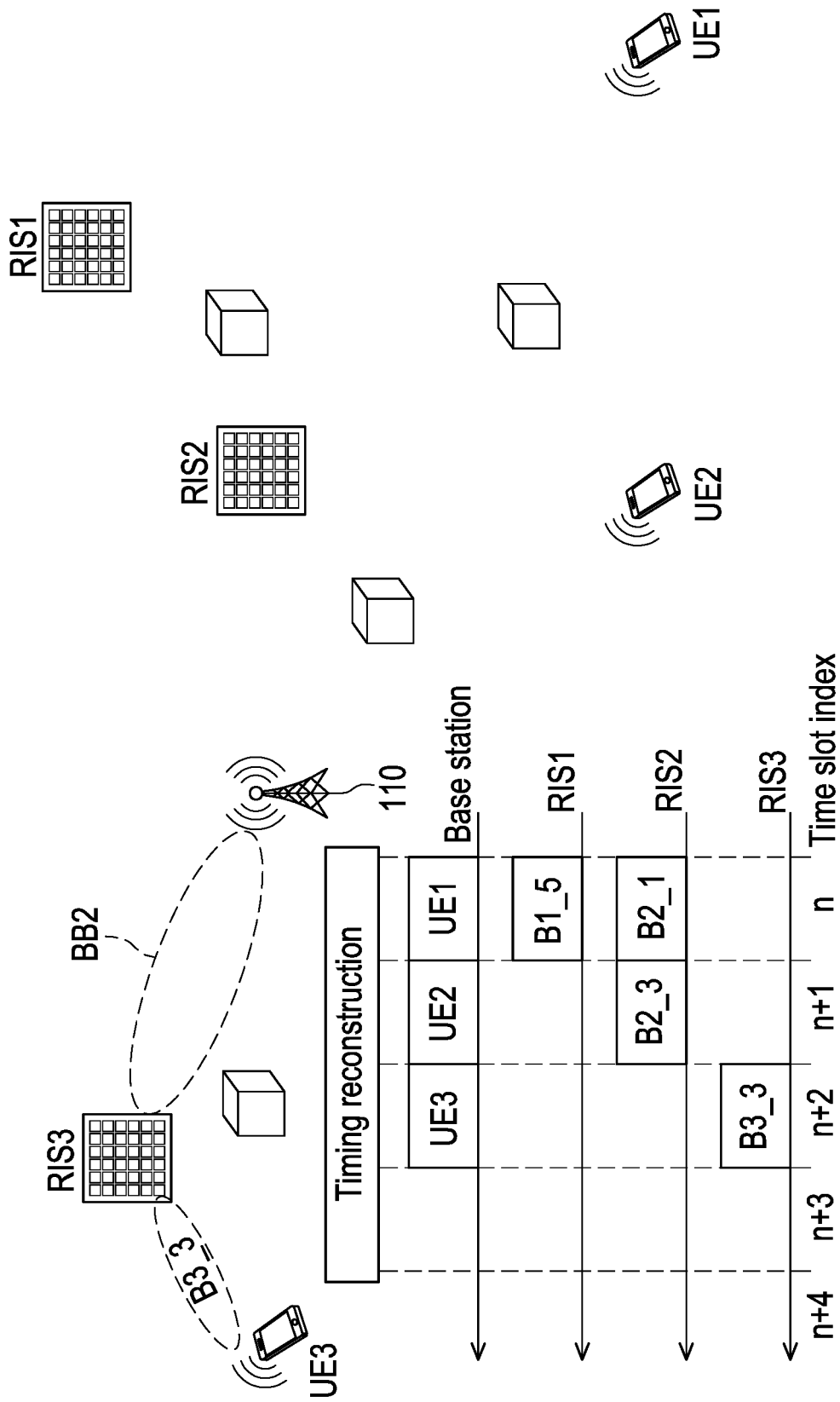

Referring to FIG. 8C, the RIS device RIS3 reflects a base station beam BB2 transmitted by the base station 110 at time slot #n+2 based on the frame boundary synchronized with the base station 110 to form a reflected beam B3_3 towards the terminal device UE3. Next, referring to FIG. 8D, the RIS device RIS2 reflects the base station beam BB1 transmitted by the base station 110 at time slot #n+3 based on the frame boundary synchronized with the base station 110 to form the reflected beam B2_3 towards the terminal device UE2. The RIS device RIS1 reflects the base station beam BB1 transmitted by the base station 110 at time slot #n+3 based on the frame boundary synchronized with the base station 110 to form the reflected beam B1_5 towards the terminal device UE1.

Figure 8D:
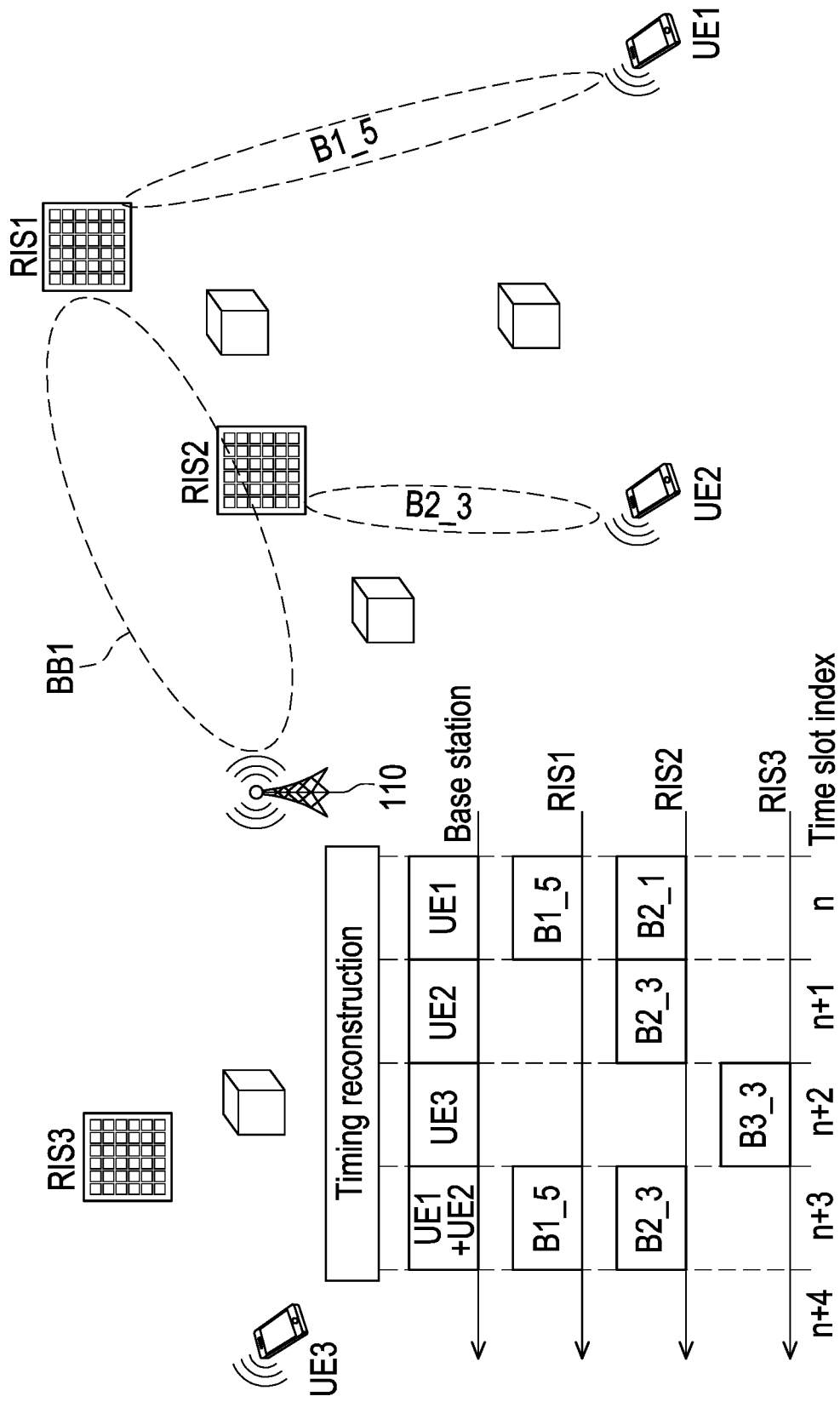

As shown in FIG. 8D, taking the RIS device RIS2 as an example, the beam scheduling information provided by the base station 110 to the RIS device RIS2 is as shown in Table 1 below, so that the RIS device RIS2 may reflect the base station beam at each of the specified time slots to form a reflected beam towards a terminal device.

TABLE 1

| Beam scheduling information | |
| --- | --- |
| Time slot index | Beam index |
| n | Beam index of reflected beam B2_1 |
| n + 1 | Beam index of reflected beam B2_3 |
| n + 3 | Beam index of reflected beam B2_3 |

Figure 9:
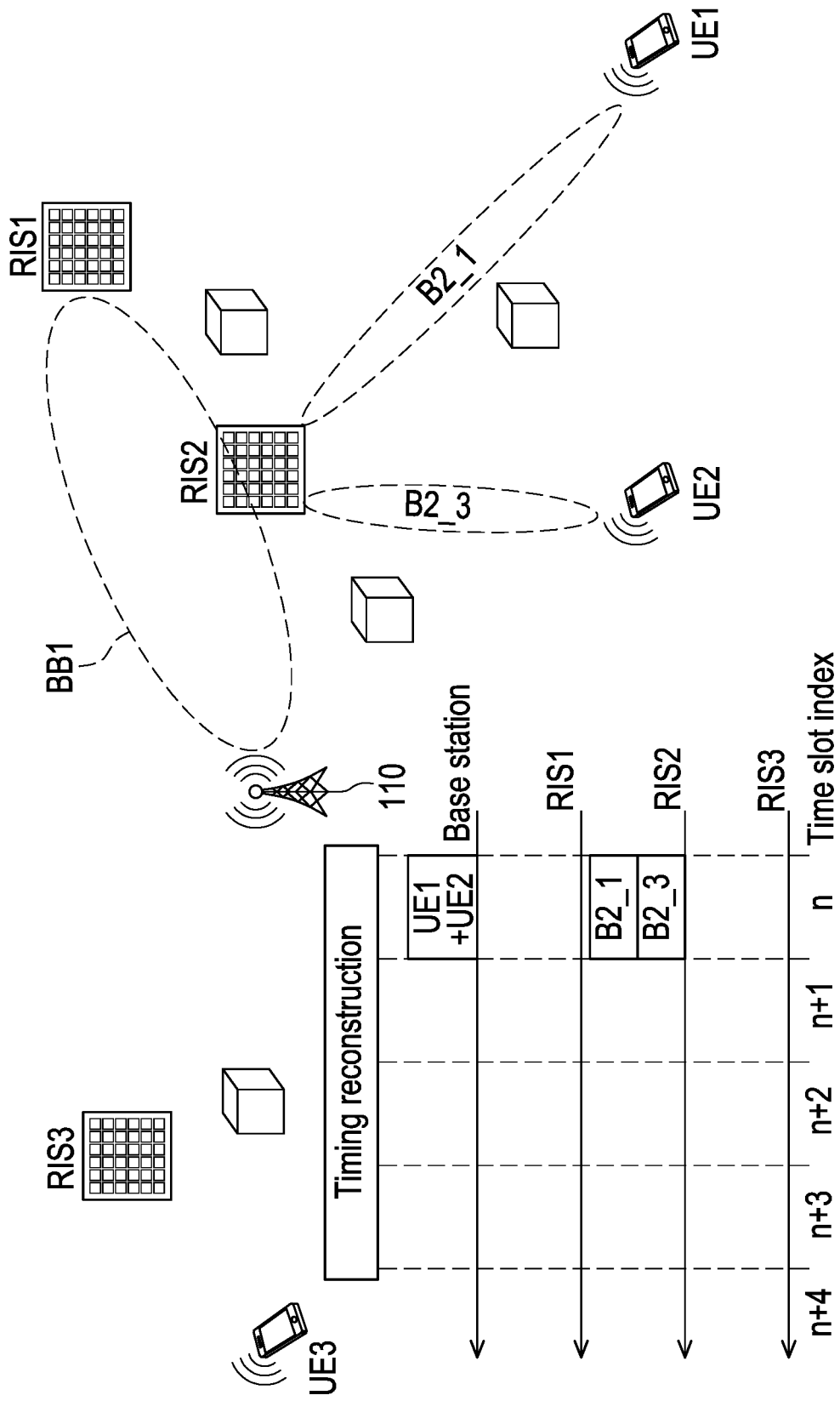
FIG. 9 is a schematic diagram of dynamically switching reflected beams according to beam scheduling information according to an exemplary embodiment of the disclosure.

FIG. 9 is a schematic diagram of dynamically switching reflected beams according to beam scheduling information according to an exemplary embodiment of the disclosure. Referring to FIG. 9, the beam scheduling information provided to the RIS device RIS2 includes the time slot index of the time slot #n and the beam index corresponding to the time slot #n. Thus, the RIS device RIS2 reflects the base station beam BB1 (the first radio signal beam in this embodiment) transmitted by the base station 110 (the radio signal transmission/reflection device in this embodiment) at time slot #n (i.e., the first time slot) based on the frame boundary synchronized with the base station 110 to form a reflected beam B2_1 (the first reflected beam in this embodiment) towards the terminal device UE1 (the first wireless communication equipment in this embodiment). In addition, the RIS device RIS2 reflects the base station beam BB1 (the first radio signal beam in this embodiment) transmitted by the base station 110 (the radio signal transmission/reflection device in this embodiment) at time slot #n (i.e., the first time slot) based on the frame boundary synchronized with the base station 110 to form a reflected beam B2_3 (the third reflected beam in this embodiment) towards the terminal device UE1 (the third wireless communication equipment in this embodiment). The reflection angle of the reflected beam B2_1 (the first reflected beam in this embodiment) is different from the reflection angle of the reflected beam B2_3 (the third reflected beam in this embodiment). That is, in the same time slot, the RIS device RIS2 reflects the base station beam to different directions to form the reflected beam B2_1 and the reflected beam B2_3.

For clarity, in the embodiment of FIG. 8A to FIG. 8D and FIG. 9, generating the base station beam by reflecting the base station by the RIS device and taking the terminal device as the signal receiving end are used as examples for illustration, but the disclosure is not limited thereto. In different embodiments, the radio signal transmission/reflection device may be a base station, a terminal device, other RIS device, or other radio equipment. The wireless communication equipment located in the direction of the reflected beam may be a base station, a terminal device, or other RIS device.

Figure 10:
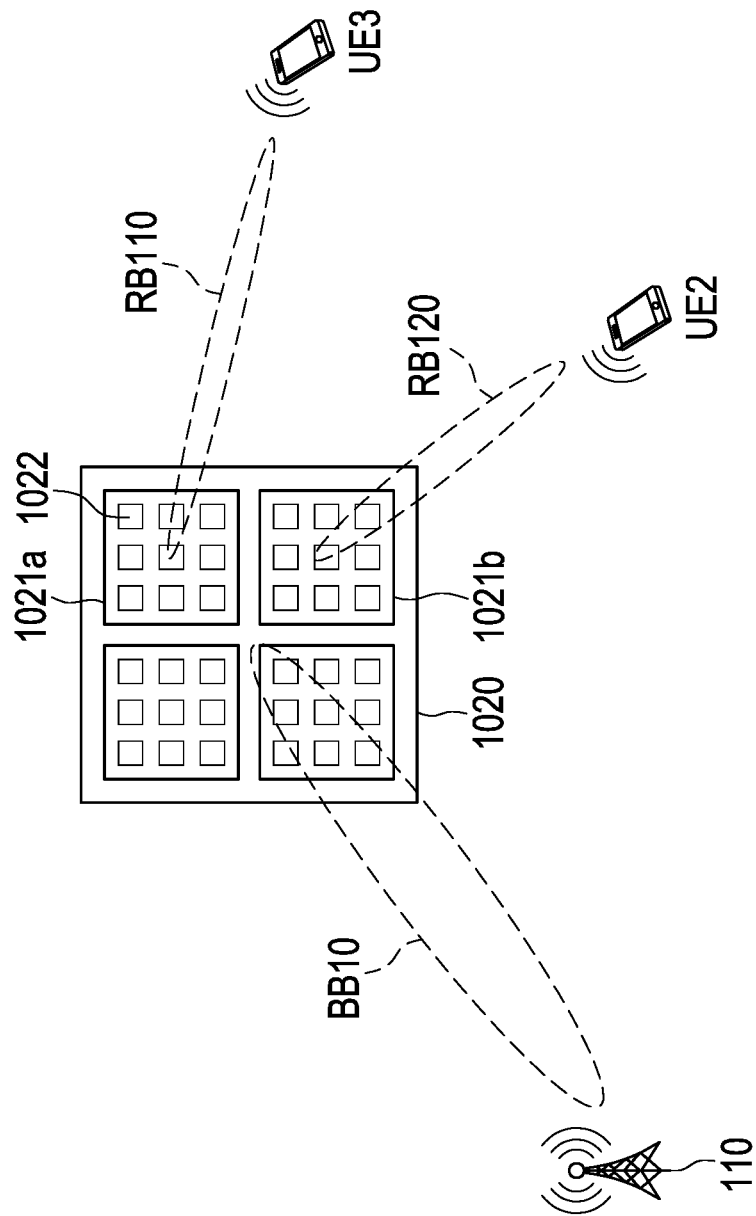
FIG. 10 is a schematic diagram of generating multiple reflected beams according to an exemplary embodiment of the disclosure.

FIG. 10 is a schematic diagram of generating multiple reflected beams according to an exemplary embodiment of the disclosure. Referring to FIG. 10, a RIS device 1020 reflects a base station beam BB10 of the base station 110 to generate a reflected beam RB120 and a reflected beam RB110 towards the terminal device UE2 and the terminal device UE3, respectively. The RIS device 1020 includes multiple first reflectors (e.g., reflector 1022) forming a first set 1021a and multiple second reflectors forming a second set 1021b. The first reflectors of the first set 1021a are configured to reflect the base station beam BB10 of the base station 110 to form the reflected beam RB110. The second reflectors in the second set 1021b are configured to reflect the base station beam BB10 of the base station 110 to form the reflected beam RB120. In some embodiments, the first reflectors of the first set 1021a are controlled according to the beam control information provided by the base station 110. Similarly, the second reflectors of the second set 1021b is controlled according to the beam control information provided by the base station 110.

To sum up, in the embodiment of the disclosure, the base station transmits the timing synchronization signal and the beam control signal to the RIS device. By transmitting the timing synchronization signal, the frame boundary of the RIS device is synchronized with the base station. After the synchronization of the frame boundary is completed, the RIS device switches the beam characteristics configuration to be adopted at different time slots according to the beam scheduling information, so as to form different reflected beams at different time slots. Thus, the disclosure not only handles the blockage effect caused by shielding objects, but also allows the RIS device to serve different terminal devices, which are closer to the actual communication system, so as to improve the signal quality and system performance.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A beamforming method, adapted to a reconfiguration intelligent surface (RIS) device, comprising:
   receiving a timing synchronization signal;
   establishing a frame boundary synchronized with a radio signal transmission/reflection device according to the timing synchronization signal;
   receiving beam control information; and
   forming a reflected beam by reflecting a radio signal beam transmitted or reflected by the radio signal transmission/reflection device according to the beam control information based on the frame boundary synchronized with the radio signal transmission/reflection device.

2. The beamforming method according to claim 1, wherein the beam control information comprises beam scheduling information, and the beam scheduling information comprises time slot information and beam identification information corresponding to the time slot information.

3. The beamforming method according to claim 2, wherein forming the reflected beam by reflecting the radio signal beam transmitted or reflected by the radio signal transmission/reflection device according to the beam control information based on the frame boundary synchronized with the radio signal transmission/reflection device comprises:
   reflecting the radio signal beam at a time slot indicated by the time slot information based on the frame boundary synchronized with the radio signal transmission/reflection device and forming the reflected beam according to the beam identification information.

4. The beamforming method according to claim 3, wherein the beam control information comprises a plurality of beam characteristics configurations, and forming the reflected beam according to the beam identification information comprises:
   forming the reflected beam according to one of the beam characteristics configurations corresponding to the beam identification information, wherein each of the beam characteristics configuration comprises a beam reflection direction parameter and a beam shape parameter.

5. The beamforming method according to claim 4, the method further comprises:
   adjusting the beam characteristics configurations based on channel measurement status associated with a base station, the RIS device, and a terminal device.

6. The beamforming method according to claim 1, wherein forming the reflected beam by reflecting the radio signal beam transmitted or reflected by the radio signal transmission/reflection device according to the beam control information based on the frame boundary synchronized with the radio signal transmission/reflection device comprises:
   forming a first reflected beam towards a first wireless communication equipment by reflecting a first radio signal beam emitted or reflected by the radio signal transmission/reflection device in a first time slot based on the frame boundary synchronized with the radio signal transmission/reflection device; and
   forming a second reflected beam towards a second wireless communication equipment by reflecting a second radio signal beam emitted or reflected by the radio signal transmission/reflection device in a second time slot based on the frame boundary synchronized with the radio signal transmission/reflection device, wherein a reflection angle of the first reflected beam is different from a reflection angle of the second reflected beam.

7. The beamforming method according to claim 6, wherein forming the reflected beam by reflecting a radio signal beam transmitted by the radio signal transmission/reflection device according to the beam control information based on the frame boundary synchronized with the radio signal transmission/reflection device further comprises:
   forming a third reflected beam towards a third wireless communication equipment by reflecting the first radio signal beam emitted or reflected by the radio signal transmission/reflection device in the first time slot based on the frame boundary synchronized with the radio signal transmission/reflection device, wherein the reflection angle of the first reflected beam is different from a reflection angle of the third reflected beam.

8. The beamforming method according to claim 1, wherein the RIS device connects to a base station via a wireless transmission link or a wired transmission link communicably and receives the timing synchronization signal from the base station.

9. The beamforming method according to claim 8, wherein the base station is the radio signal transmission/reflection device.

10. The beamforming method according to claim 8, wherein the beam control information is received from the base station, another base station, or other control devices.

11. The beamforming method according to claim 1, wherein the radio signal transmission/reflection device comprises a base station, a terminal device, or another RIS device.

12. The beamforming method according to claim 1, wherein establishing the frame boundary synchronized with the radio signal transmission/reflection device according to the timing synchronization signal comprises:
   obtaining a clock shift between a reference clock of the radio signal transmission/reflection device and a local clock of the RIS device according to the timing synchronization signal; and establishing the frame boundary synchronized with the radio signal transmission/reflection device according to the clock shift.

13. A reconfiguration intelligent surface (RIS) device, comprising:
   a reconfiguration intelligent surface;
   a transceiver;
   a memory; and
   a processor, coupled to the reconfiguration intelligent surface, the transceiver, and the memory, and configured to:
      receive a timing synchronization signal through the transceiver;
      establish a frame boundary synchronized with a radio signal transmission/reflection device according to the timing synchronization signal;
      receive beam control information through the transceiver; and
      form a reflected beam by reflecting, using the reconfiguration intelligent surface, a radio signal beam transmitted or reflected by the radio signal transmission/reflection device according to the beam control information based on the frame boundary synchronized with the radio signal transmission/reflection device.

14. The reconfiguration intelligent surface device according to claim 13, wherein the beam control information comprises beam scheduling information, and the beam scheduling information comprises time slot information and beam identification information corresponding to the time slot information.

15. The reconfiguration intelligent surface device according to claim 14, wherein the processor is further configured to:
   reflect the radio signal beam at a time slot indicated by the time slot information based on the frame boundary synchronized with the radio signal transmission/reflection device and form the reflected beam according to the beam identification information.

16. The reconfiguration intelligent surface device according to claim 15, wherein the beam control information comprises a plurality of beam characteristics configurations, and the processor is further configured to:
   form the reflected beam according to one of the beam characteristics configurations corresponding to the beam identification information, wherein each of the beam characteristics configuration comprises a beam reflection direction parameter and a beam shape parameter.

17. The reconfiguration intelligent surface device according to claim 16, wherein the processor is further configured to:
   adjust the beam characteristics configurations based on channel measurement status associated with a base station, the RIS device, and a terminal device.

18. The reconfiguration intelligent surface device according to claim 13, wherein the processor is further configured to:
   form a first reflected beam towards a first wireless communication equipment by reflecting a first radio signal beam emitted or reflected by the radio signal transmission/reflection device in a first time slot based on the frame boundary synchronized with the radio signal transmission/reflection device; and
   form a second reflected beam towards a second wireless communication equipment by reflecting a second radio signal beam emitted or reflected by the radio signal transmission/reflection device in a second time slot based on the frame boundary synchronized with the radio signal transmission/reflection device, wherein a reflection angle of the first reflected beam is different from a reflection angle of the second reflected beam.

19. The reconfiguration intelligent surface device according to claim 18, wherein the processor is further configured to:
   form a third reflected beam towards a third wireless communication equipment by reflecting the first radio signal beam emitted or reflected by the radio signal transmission/reflection device in the first time slot based on the frame boundary synchronized with the radio signal transmission/reflection device, wherein the reflection angle of the first reflected beam is different from a reflection angle of the third reflected beam.

20. The reconfiguration intelligent surface device according to claim 13, wherein the transceiver connects to a base station via a wireless transmission link or a wired transmission link communicably and receives the timing synchronization signal from the base station.

21. The reconfiguration intelligent surface device according to claim 20, wherein the base station is the radio signal transmission/reflection device.

22. The reconfiguration intelligent surface device according to claim 20, wherein the beam control information is received from the base station, another base station, or other control devices.

23. The reconfiguration intelligent surface device according to claim 13, wherein the radio signal transmission/reflection device comprises a base station, a terminal device, or another RIS device.

24. The reconfiguration intelligent surface device according to claim 13, wherein the processor is further configured to:
   obtain a clock shift between a reference clock of the base station and a local clock of the RIS device according to the timing synchronization signal; and
   establish the frame boundary synchronized with the base station according to the clock shift.

* * * * *